US012206164B2

(12) United States Patent
Kim et al.

(10) Patent No.: US 12,206,164 B2
(45) Date of Patent: Jan. 21, 2025

(54) METHOD AND APPARATUS FOR A CONVERGED 5G FR1 AND FR2 ANTENNA

(71) Applicant: Dell Products, LP, Round Rock, TX (US)

(72) Inventors: Changsoo Kim, Cedar Park, TX (US); Sumana Pallampati, Nagpur (IN); Ching Wei Chang, Cedar Park, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 105 days.

(21) Appl. No.: 17/511,026

(22) Filed: Oct. 26, 2021

(65) Prior Publication Data

US 2023/0128811 A1 Apr. 27, 2023

(51) Int. Cl.

| | |
|---|---|
| ***H01Q 1/02*** | (2006.01) |
| ***H01Q 1/22*** | (2006.01) |
| ***H01Q 1/24*** | (2006.01) |
| ***H01Q 1/44*** | (2006.01) |
| ***H01Q 1/50*** | (2006.01) |
| ***H01Q 1/52*** | (2006.01) |
| ***H01Q 9/30*** | (2006.01) |
| ***H01Q 21/28*** | (2006.01) |
| ***H01Q 23/00*** | (2006.01) |

(52) U.S. Cl.

CPC ................. *H01Q 1/44* (2013.01); *H01Q 1/02* (2013.01); *H01Q 1/2283* (2013.01); *H01Q 1/241* (2013.01); *H01Q 1/526* (2013.01); *H01Q 9/30* (2013.01); *H01Q 21/28* (2013.01); *H01Q 23/00* (2013.01); *H01Q 1/2266* (2013.01); *H01Q 1/50* (2013.01)

(58) Field of Classification Search

CPC ...... H01Q 1/02; H01Q 1/2266; H01Q 1/2283; H01Q 1/241; H01Q 1/44; H01Q 1/50; H01Q 1/526; H01Q 9/30; H01Q 21/28; H01Q 23/00

See application file for complete search history.

(56) References Cited

U.S. PATENT DOCUMENTS

| | | | | |
|---|---|---|---|---|
| 2019/0207323 | A1* | 7/2019 | Joung | H01Q 9/0407 |
| 2020/0127361 | A1* | 4/2020 | Lee | H05K 9/0032 |
| 2023/0096131 | A1* | 3/2023 | Wei | H01Q 7/00 343/866 |

* cited by examiner

*Primary Examiner* — Robert Karacsony

(74) *Attorney, Agent, or Firm* — Prol Intellectual Property Law, PLLC; H. Kenneth Prol

(57) ABSTRACT

An information handling system operating a converged 5G antenna module includes a processor; a memory; a power management unit; the processor executing a wireless interface adapter configure to concurrently operate a converged 5G antenna module at a new radio frequency range 1 (NRFR1) frequency and a NRFR2 frequency; a first radio subsystem including a first front end operatively coupled to a mmWave antenna of the converged 5G antenna module to communicate via an NRFR2 wireless communication signal; and a second radio subsystem including a second antenna front end operatively coupled to a cooling element structure of the converged 5G antenna module to receive an NRFR1 wireless communication signal via the cooling element structure of the converged 5G antenna module.

20 Claims, 5 Drawing Sheets

METHOD AND APPARATUS FOR A CONVERGED 5G FR1 AND FR2 ANTENNA

FIELD OF THE DISCLOSURE

The present disclosure generally relates to an information handling system communicating with a wireless network. The present disclosure more specifically relates to transception of data to and from a network via a converged 5G antenna module of the information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include an antenna system used to communicate with a wireless network to transceive data.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
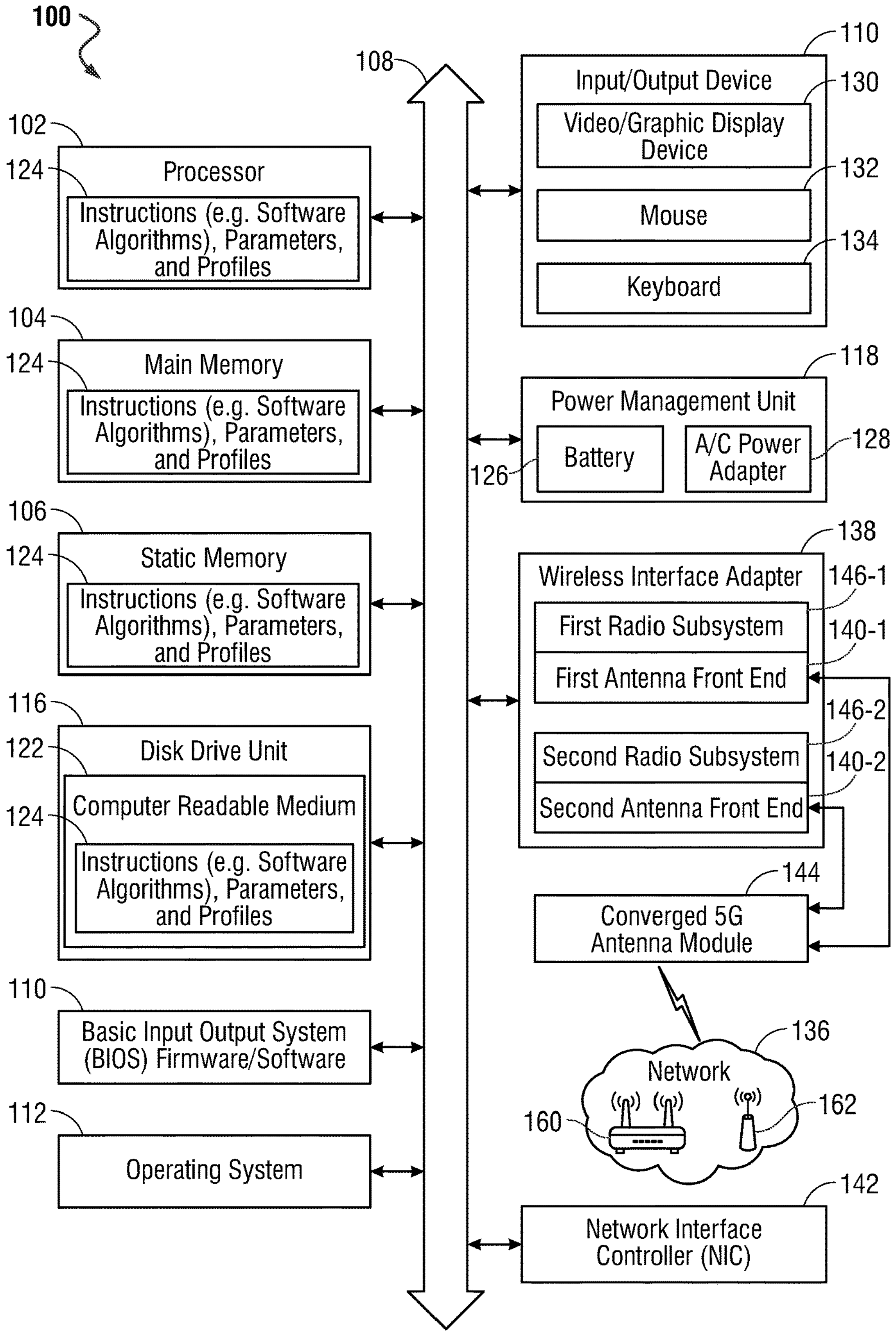
FIG. 1 is a block diagram illustrating an information handling system operating a converged 5G antenna module according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to receive and transmit various signals simultaneously increase in demand. These mobile endpoint devices in embodiments of the present disclosure may employ data transceptions using a plurality of antenna systems for communication via wireless links operating on a variety of radio access technologies (RAT). With the progression in the technologies related to 5G protocols and increased use of antenna communication systems using these 5G protocols within computing devices, the industry is moving forward with advanced wireless technology while millimeter wave (mmWave) frequencies are also being widely adopted and commercialized. As the designs of the information handling systems are made more aggressive, thinner, lighter, compact, with full metal chassis, the complexity of these information handling systems is also increased. This decrease in size of the information handling system poses a significant lack of area within the information handling system to place an estimated eight to nine antennas in order to support 5G protocol communications. As an example, two wireless local-area network (WLAN) antennas in a 2×2 configuration, four LTE/FR1 wireless wide-area network (WWAN) antennas in a 4×4 configuration, and two to three FR2 mmWave antennas may be needed within the housing of the information handling system to communicate with the various WLAN and WWAN networks available to these types of information handling systems. Therefore, there may be as many as eight to nine antennas, each including its own radios and connections to be placed within the housing of the information handling systems. Furthermore, these eight to nine antennas may require certain keep out housings to protect the antennas from interfacing with the metal housing of the information handling system, other active components within the housing, and between other antennas to avoid RF interference and improve isolation for good radiated system performance. This only increases the space necessary to house these antennas. Clearly, more antennas require more complexity and limitations to highly integrated systems also housed within the housing of the information handling system.

The present disclosure may employ separate antenna systems for Wi-Fi signals, wireless wide area network (WWAN) signals, Bluetooth signals, and wireless local area network (WLAN) signals while decreasing the number of antennas or antenna systems within the housing of the information handling system. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, emerging 5G standards, or WiMAX, small cell WWAN, and the like. Wi-Fi and WLAN signals in embodiments of the present disclosure may include wireless links adhering to standards such as, for example, IEEE 802.11 WiFi, IEEE 802.11ad WiGig, IEEE 802.15 WPAN, and IEEE 802.11ax-2021 (e.g., WiFi 6 and 6E, 6 GHz technologies). In other aspects, several antenna systems may be available for each RAT to enable aggregated data communications such as via plural multiple in, multiple out (MIMO) streams to enhance data bandwidth or reliability.

The present specification allows for concurrent wireless communication via a new radio frequency range 1 (NRFR1) frequency and a NRFR2. The NRFR1, also called FR1, has a frequency range of 1.8 GHz to 5 GHz (e.g., sub-6 GHZ frequencies) and includes a number of bands in a 1.8 GHz to 2.2 GHz frequency range such as B1/n1, B2/n2, B3/n3, B4, B66/n66, and B25. The FR1 also includes bands in a 2.3 GHz to 2.7 GHz range that includes bands such as B7/n7, B30, B40, B38/n38, and B41/n41. The FR1 also includes bands in a 3.3 GHz to 5.0 GHz range that includes bands such as B42, B48/n48, n77, n78, and n79. These frequency ranges and bands are separated from the NRFR2 (aka FR2) frequencies by as much as 20 GHz with the NRFR2 frequency range ranging from 26 GHz to 40 GHz that includes bands such as n257, n258, n260, and n261.

The concurrent wireless communication using these FR1 and FR2 frequencies is accomplished using a converged 5G antenna module in an embodiment. This converged 5G antenna module is excited by a wireless interface adapter concurrently at a sub-6 GHZ FR1 frequency and at a FR2 frequency. The converged 5G antenna module may have a cooling structure of a length that is approximately one quarter wavelength a lowest FR1 frequency to be transceiver in an embodiment and include a mmWave antenna module with an array of patch antennas for FR2 frequency transception. By operatively coupling an FR1 signal line from a first radio and antenna front end to the converged 5G antenna module cooling structure the to receive or transmit FR1 frequencies via the body of the cooling structure (e.g., a heatsink). In a specific example embodiment, the cooling structure is made of metal and has a quarter-wave wavelength dimension which may be, for example, approximately 38 mm to accommodate a low frequency of about 1.8 GHz in the middle range of FR1 supported frequencies. The mm Wave antenna module may additionally receive an FR2 excitation frequency via a second radio and front end to a patch array of antennas on a printed circuit board mounted on the mm Wave antenna module.

The mm Wave antenna module used as the converged 5G antenna module may include a 1×4 patch array of antennas that increases the gain of the converged 5G antenna module and change the phase of RF electromagnetic (EM) waves emitted by the converged 5G antenna module to steer the RF EM mmWaves for the FR2 frequencies. In an embodiment, a patch antenna element of the mmWave antenna module is a type of RF antenna with a low profile, mounted on a flat surface such as a circuit board, and consisting of a sheet or "patch" of metal mounted over a larger sheet of metal called a ground plane. This may be used to allow the millimeter wave antenna to direct the RF EM mmWaves away from an information handling system and toward a specific access point or base station remote from the information handling system. By doing so, the communication with the access point or base station and any network attached thereto may be increased allowing for the millimeter wave antenna to effectively transmit large amounts of data. The millimeter wave antenna may steer the RF EM waves by, for example, controlling the phase and relative amplitude of the RF EM waves emitted by each of the patch antenna elements in order to create a pattern of constructive and destructive interference among the entire wave front produced by the millimeter wave antenna. Thus, with the use of the converged 5G antenna module for both FR1 and FR2 frequencies, the converged 5G antenna module may be co-located or integrated with the cooling structure to keep the converged 5G antenna module mmWave patch antenna array and active elements co-located on the patch antenna array PCB cool and keep any RF interference from other elements in the information handling system from interfering with the transception of the data wirelessly.

Where multiple WWAN antennas are included in the housing of the information handling system, a converged 5G antenna modules may operate with other antennas (e.g., other LTE WWAN antennas) in a MIMO configuration such as a 4×4 MIMO configuration. This allows the same or similar transception functions to be conducted with fewer antenna systems being present in the information handling system.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system may include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices, one or more communications ports for communicating with external devices, as well as various input and output (I/O) devices 114, such as a keyboard 134, a mouse 132, a headset, a stylus, a video/graphic display 130, or any combination thereof. The information handling system 100 may also include one or more buses 108 operable to transmit communications between the various hardware components. Portions of an information handling system 100 may themselves be considered information handling systems 100.

Information handling system 100 may include devices or modules that embody one or more of the devices or execute instructions for the one or more systems and modules described herein and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, or other memory of computer readable medium 122 storing instructions 124 executable by the wireless interface adapter 138, and drive unit 116 (volatile (e.g., random-access memory, etc.), nonvolatile memory (read-only memory, flash memory etc.) or any combination thereof. The information handling system 100 may also include one or more buses 108 operable to transmit communications between the various hardware components such as any combination of various input and output (I/O) devices.

The information handling system 100 may further include a video/graphic display device 130. The video/graphic display device 130 in an embodiment may function as a liquid crystal display (LCD), an organic light emitting diode (OLED), a flat panel display, or a solid-state display. Additionally, the information handling system 100 may include an input/output device 114 that allows the user to interface with the information handling system 100 via the video/graphic display device 130, such as a cursor control device (e.g., the mouse, a touchpad, or gesture or touch screen input), and a keyboard 134 among others. Various drivers and control electronics may be operatively coupled to operate input/output devices 114 such as the keyboard 134 and touchpad according to the embodiments described herein.

The network interface device in FIG. 1 is shown as a wireless interface adapter 138 but may also be a wired network interface device as is understood in the art and may provide connectivity to a network 134, e.g., a wide area network (WAN), a local area network (LAN), wireless local area network (WLAN), a wireless personal area network (WPAN), a wireless wide area network (WWAN), or other network. The wireless interface adapter 138 may provide connectivity to a network 136 via operation of a first radio subsystem 146-1 that includes a first antenna front end 140-1 and a second Radio subsystem 146-2 that includes a second antenna front end 140-2 being controlled by an antenna controller or other processing device. It is appreciated that any number of radios and RF front ends 146-1, 146-2 may be associated with a plurality of antennas. Connectivity may be via wired or wireless connection. The wireless interface adapter 138 may operate in accordance with any wireless data communication standards. To communicate with a wireless local area network, standards including IEEE 802.11 a/h/j/n/ac/ax WLAN standards, IEEE 802.15 WPAN standards, WWAN such as 3GPP or 3GPP2, or similar wireless standards may be used. In some aspects of the present disclosure, one wireless interface adapter 138 may operate two or more wireless links.

The wireless interface adapter 138 may connect to any combination of macro-cellular or small cell wireless connections with wireless protocols including 2G, 2.5G, 3G, 4G, 5G, up-coming 6G, or the like from one or more service providers or privately administered network providers. The wireless interface adapter 138 may also connect to any WLAN networks such as Wi-Fi networks. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 134 may communicate voice, video or data over the network 136. Further, the instructions 124 may be transmitted or received over the network 136 via the network interface device or wireless interface adapter 138. In an embodiment, the network 136 may include an access point 160 and/or base station 162 used by the information handling system 100 to wirelessly transmit data across the network.

The information handling system 100 may include a set of instructions 124 that may be executed to cause the computer system to perform any one or more of the methods or computer-based functions disclosed herein. For example, instructions 124 may be executed by an antenna controller or the processor 102, and may include software applications, or other aspects or components used to execute the methods and systems described herein. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 may include a computer-readable medium 122 in which one or more sets of instructions 124 such as software may be embedded and executed by the antenna controller or the processor 102, in an embodiment. Similarly, main memory 104 and static memory 106 may also contain a computer-readable medium for storage of one or more sets of instructions, parameters, or profiles 124 including wireless communication modulation instructions that allow for modulation of any transception signal emitted by a converged 5G antenna module 144 as directed by the operation of the wireless interface adapter 138, first Radio subsystem 146-1 with its first antenna front end 140-1, and second Radio subsystem 146-2 with its second antenna front end 140-2 by the processor 102. The disk drive unit 116 and static memory 106 may also contain space for data storage. Further, the instructions 124 may embody one or more of the methods or logic as described herein. For example, instructions relating to the operation of the converged 5G antenna, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the instructions 124 to be executed by a processor 102 for software applications may be executed locally, remotely or a combination thereof. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The computer executable instructions 124 to be executed during operation of the wireless interface adapter 138 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

As described herein, the information handling system 100 may also include a converged 5G antenna module 144 according to various embodiments. As shown in FIG. 1, the converged 5G antenna module 144 is operatively coupled to both the first antenna front end 140-1 and second antenna front end 140-2. By operatively coupling the first antenna front end 140-1 at the first Radio subsystem 146-1 to the converged 5G antenna module 144 patch antenna array, the converged 5G antenna module 144 patch antenna array may be excited at an FR2 frequency while concurrently being excited or receiving radio signals at an FR1 frequency on a cooling element structure in an embodiment. In a particular embodiment, the converged 5G antenna module 144 is a mmWave antenna module that includes a metal cooling element structure such as a heat sink. In an embodiment, this cooling element may be oriented on an opposite side of an antenna printed circuit board (PCB) from the mmWave antenna is affixed to and may be used by the second antenna front end 140-2 to pass an excitation signal to in order to excite the cooling element at a FR1 frequency. In a particular embodiment, the mmWave antenna module may be a quarter-wavelength in length for the lowest operating frequency, for example 38 mm in length for 1.8-1.9 GHZ, and used to receive or emit those frequencies associated with the FR1 frequencies via the second antenna front end 140-2. In a particular embodiment, the FR1 frequencies received or emitted by the cooling element may be between 1.8 and 2.2 GHz. In another embodiment, the FR1 frequencies received or emitted by the cooling element may be between 1.8 and 5.0 GHz, for example the FR1 mid-range frequencies. In an embodiment, the mmWave antenna module as an example of the converged 5G antenna module 144 may also include a 1×4 patch array of antennas external to the cooling element operatively coupled to the cooling element and cooled along with active elements by the cooling element of the converged 5G antenna module 144. This patch array formed for the mmWave antenna may be used to emit frequencies associated with FR2 frequencies and used to increase the gain of coverage 5G antenna and potentially change the phase of any RF EM waves emitted by the converged 5G antenna module 144 at, at least, the FR2 frequencies.

In an embodiment, the length of the converged 5G antenna module 144 (e.g., a mmWave antenna module and cooling element) is a quarter wavelength of lowest frequency of a long-term evolution (LTE) antenna for the converged 5G frequencies within the information handling system. With the length of the converged 5G antenna module 144 being set to a quarter wavelength of the lowest frequency of a LTE antenna, the body and structure of the converged 5G antenna module 144 integrated as the cooling element structure (e.g., heat sink) may be utilized for emitting FR1 frequencies via an additional RF feed coupled to the converged 5G antenna module 144 cooling element body. In this embodiment, the second antenna front end 140-2 may be operatively coupled to an excitation location on the structure of the converged 5G antenna module 144 (e.g., the heat sink) and provide an excitation signal or receive signals at an FR1 frequency. The excitation of or reception of signal from the converged 5G antenna module 144 via the second antenna front end 140-2 may additionally be used in concert with other antenna systems in the information handling system to engage in multiple-input, multiple-output (MIMO) usage in an embodiment. These other antenna systems may include a group of MIMO antennas that include a first or main MIMO antenna (e.g., MIMO main; Antenna 0), a second or auxiliary MIMO antenna (e.g., MIMO aux; Antenna 1), a third MIMO antenna (e.g., MIMO2; Antenna 2), and a fourth MIMO antenna (e.g., MIMO3; Antenna 3). In this embodiment, the excitation of or reception of signal from the converged 5G antenna module 144 cooling element body via the second antenna front end 140-2 may be used as the fourth MIMO antenna (e.g., MIMO3) and in some embodiments may only receive signal and not transmit signal. In such an embodiment, the converged 5G antenna module 144 may operate in both FR1 and FR2 frequency ranges but without FR1 transmission may maintain specific absorption rate (SAR) levels at a manageable level in some embodiments with the cooling element operating as a MIMO3 FR1 antenna. In this embodiment, the higher frequencies within the FR2 range may be used at the converged 5G antenna module 144 with a patch antenna array (e.g., 1×4 patch antenna array) mounted outward on the cooling element structure from the information handling system to communicate using a 5G protocol in FR2 frequencies while concurrently communicating and transceiving data via a FR1 frequency individually or in concert with other MIMO antennas. The converged 5G antenna module 144 may also include local active elements for the mmWave antenna patch antenna array including a power amplifier module and a transceiver to increase the transmission to FR2 frequencies from intermediate frequencies (I/F) signals received from the first Radio subsystem 146-1 to avoid loss from the radio to the patch antennas. These active components may be co-located on the patch antenna array PCB in a first antenna front end 140-1 in an embodiment and may generate heat. The cooling element structure, for example heat sink, of the converged 5G antenna module 144 may cool these FR2 active components as well as operate to receive or transmit FR1 signals in an embodiment. In these embodiments, the natural duplexing of the FR1 and FR2 frequencies, due to the 20 GHz separation between them, allows the excitation of the converged 5G antenna module 144 at the FR1 and FR2 frequency ranges without the use of a low-band/high-band filter or other diplexing circuitry. In an embodiment, the excitation of the converged 5G antenna module 144 via the second antenna front end 140-2 may be used to receive data communications only. In another embodiment, the excitation of the converged 5G antenna module 144 via the second antenna front end 140-2 may be used to both receive and transmit data. In this embodiment, in order to limit the specific absorption rate (SAR) for human contact, the information handling system 100 may include a SAR monitoring system used to limit the transmissions at the converged 5G antenna module 144. Here, the SAR monitoring system may monitor for human proximity or contact at the converged 5G antenna module 144 and cause the transmissions from the second Radio subsystem via the second antenna front end 140-2 to only reception of data at the converged 5G antenna module 144.

As described herein, by combining an FR2 frequency emitting antenna with an FR1 frequency emitting antenna (e.g., a mmWave antenna module) reduces the number of antennas within the housing of the information handling system 100 as a result of a single antenna system being used to perform those transceptions of data that would otherwise be accomplished via two individual antennas. This reduces the overall number of antenna systems within the information handling system while still providing similar wireless connectivity to the networks 136. This also increases the usable space within the housing of the information handling system in an embodiment. Alternatively, the reduction in the number of antennas within the information handling system 100 allows the dimensions of the information handling system to be decreased and, accordingly, the weight of the information handling system 100 to be reduced in an embodiment. This allows the aesthetics and mobility of the information handling system.

In some embodiments herein, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 114, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

The information handling system 100 may include one or more of an operating system (OS) 112, and basic input/output system (BIOS) firmware/software 110 or application programs that may be executable instructions 124 executed at any processor 102 and stored at one or more memory devices 104, 106, or 116. BIOS firmware/software 110 functions to initialize the information handling system 100 on power up, to launch an OS 112, and to manage input and output interactions between the OS 112 and the other elements of information handling system 100 including converged 5G antenna module 144 described herein. In a particular embodiment, BIOS firmware/software 110 resides in memory 104, and include machine-executable code that is executed by processor 102 to perform various functions of information handling system 100 as described herein. In another embodiment (not illustrated), application programs and BIOS firmware/software 110 reside in another storage medium of the information handling system 100. For example, application programs and BIOS firmware/software 110 can reside in drive 116, in a ROM (not illustrated) associated with the information handling system 100, in an option-ROM (not illustrated) associated with various devices of the information handling system 100, in a storage system (not illustrated) associated with network channel of a wireless interface adapter 138, in another storage medium of the information handling system 100, or a combination thereof. Executable code instructions 124 for application programs and BIOS firmware/software 110 can each be implemented as single programs, or as separate programs carrying out the various features as described herein.

Figure 2:
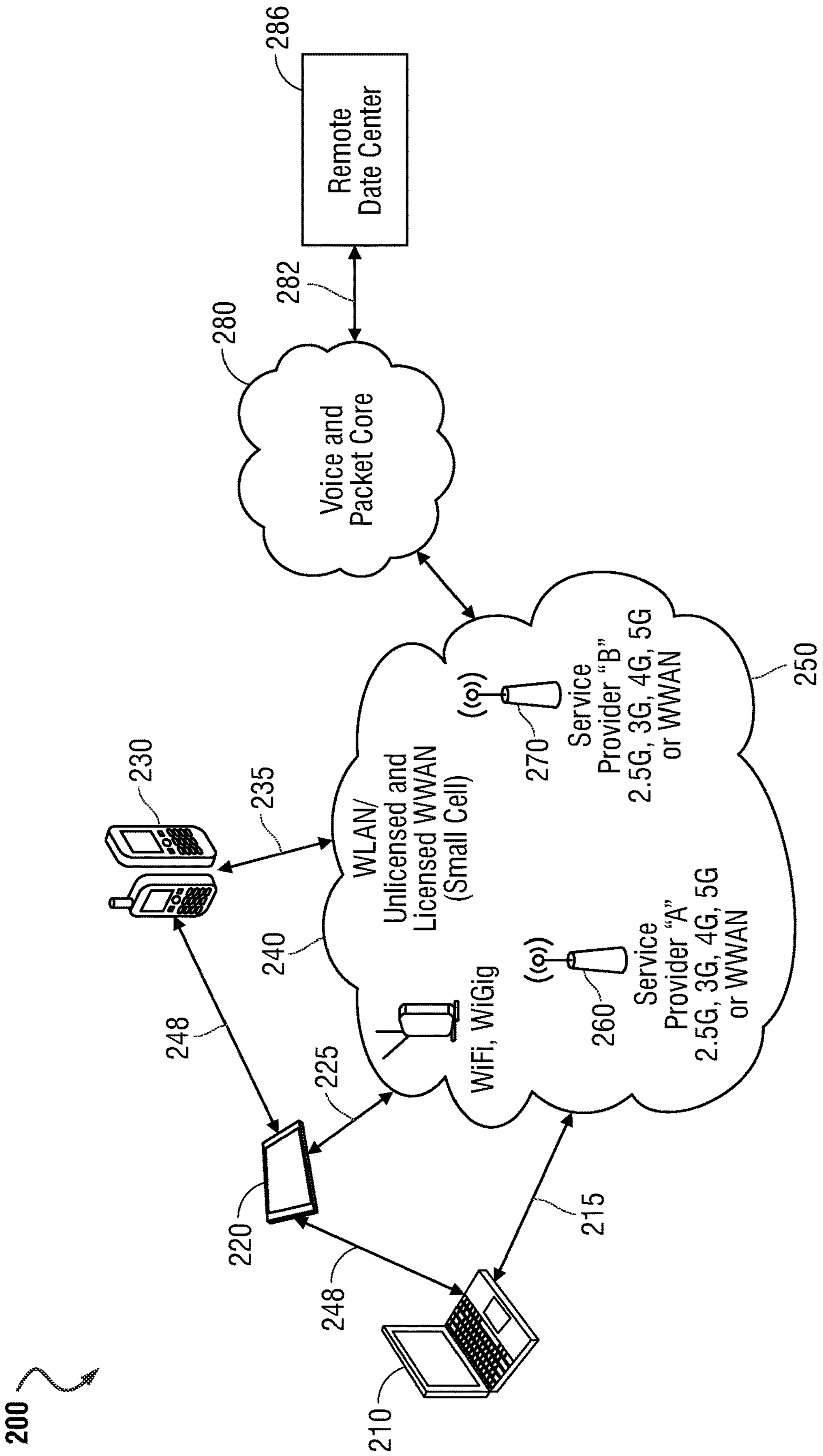
FIG. 2 is a block diagram of a network environment offering several communication protocol options and mobile information handling systems according to an embodiment of the present disclosure.

FIG. 2 illustrates a network 200 that can include one or more endpoint devices 210, 220, 230. The endpoint devices 210, 220, 230 shown in FIG. 2 may be similar to the information handling system 100 described in connection with FIG. 1. In a particular embodiment, network 200 includes networked mobile endpoint devices 210, 220, 230, wireless network access points, and multiple wireless connection link options. A variety of additional computing resources of network 200 may include client mobile information handling systems, data processing servers, network storage devices, local and wide area networks, a RAN service provider, or other resources as needed or desired. As partially depicted, endpoint devices 210, 220, 230 may be a laptop computer, tablet computer, 360-degree convertible systems, wearable computing devices, or a smart phone device. These mobile endpoint devices 210, 220, 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option. As described herein, the endpoint devices 210, 220, 230 may include the converged 5G antenna described in connection with FIG. 1 and may use the FR1 and FR2 frequencies to communicate to the WLAN and WWAN networks via base stations or access points as described herein.

Since WPAN or Wi-Fi Direct connection 248 and WWAN networks can functionally operate similar to WLANs, they may be considered as wireless local area networks (WLANs) for purposes herein. In an embodiment, the endpoint devices 210, 220, 230 that form part of this WLAN may be considered and organization. Components of a WLAN may be connected by wireline or Ethernet connections to a wider external network such as a voice and packet core 280. For example, wireless network access points or base stations may be connected to a wireless network controller and an Ethernet switch similar to that described in connection with FIG. 1. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or 5G small cell WWAN communications such as gNodeB, eNodeB, or similar wireless network protocols and access points. Alternatively, other available wireless links within network 240 may include macro-cellular connections 250 via one or more service providers 260 and 270. Again, as described herein, the organization of a number of endpoint devices 210, 220, 230 may be defined by the endpoint devices 210, 220, 230 accessing a specific or number of specific base stations. As described herein, the endpoint devices 210, 220, 230 may be operatively coupled to any of the macro-cellular connections 250 via one or more service providers 260 and 270 or to the wireless local area networks (WLANs) selectively. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, upcoming 3GPP protocols, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHZ). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies in an FR1 range between 1.8 and 5 GHZ.

Additionally, high-band 5G frequencies may operate at 25 to 39 GHz and even higher. In additional examples, WWAN carrier licensed bands may operate at the new radio frequency range 1 (NRFR1), NRFR2, bands, and other known bands as described herein per the operation of the converged 5G antenna. Each of these frequencies used to communicate over the network 240 may be based on the radio access network (RAN) standards that implement, for example, eNodeB or gNodeB hardware connected to mobile phone networks (e.g., cellular networks) used to communicate with the endpoint devices 210, 220, 230. In the example embodiment, mobile endpoint devices 210, 220, 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the endpoint devices 210, 220, 230 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile endpoint devices 210, 220, 230 may each have a plurality of wireless network interface systems or radio protocol subsystems capable of transmitting simultaneously within several communication bands or even utilizing a shared communication frequency band access multiple protocols. That communication within a shared communication frequency band may be sourced from different protocols on parallel wireless network interface systems or from a single wireless network interface system capable of transmitting and receiving from multiple protocols. Similarly, a single antenna or the plurality of antennas in each endpoint device 210, 220, 230 may be used on each of the wireless communication devices such as according to embodiments herein and may be suited to plural RF bands. As described herein, each of the endpoint devices 210, 220, 230 may include a converged 5G antenna that is capable of transmitting and receiving data using an FR1 and FR2 frequency concurrently to communicate with multiple networks. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on an endpoint device 210, 220, 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein. The antenna may cooperate with other antennas in a N×N MIMO (where "N" is any number) array configuration according to the embodiments described herein. Alternatively, embodiments may include a single transceiving antennas capable of receiving and transmitting, and/or more than one transceiving antennas. Each of the antennas included in the endpoint devices 210, 220, 230 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile endpoint devices 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile endpoint devices 210, 220, 230. Alternatively, mobile endpoint devices 210, 220, 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. In an embodiment, the remote data center 286 may include one or more servers. In another embodiment, the on-demand network slice overlay optimization system 201 may be directly accessible by the endpoint devices 210, 220, 230 via the one or more networks. Having such remote capabilities may permit fewer resources to be maintained at the mobile endpoint devices 210, 220, 230 allowing streamlining and efficiency within those devices. Similarly, remote data center permits fewer resources to be maintained in other parts of network 200.

Although network connections 215, 225, and 235 are shown connecting wireless adapters of mobile endpoint devices 210, 220, 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile endpoint devices 210, 220, 230 may communicate intra-device via intra-device connections 248 when one or more of the mobile endpoint devices 210, 220, 230 are set to act as an access point or even potentially an WWAN connection via small cell communication on licensed or unlicensed WWAN connections. For example, one of the endpoint devices 210, 220, 230 may serve as a Wi-Fi hotspot in an embodiment. Concurrent wireless links to the endpoint devices 210, 220, 230 may be connected via any access points including other mobile information handling systems as illustrated in FIG. 2.

Figure 3:
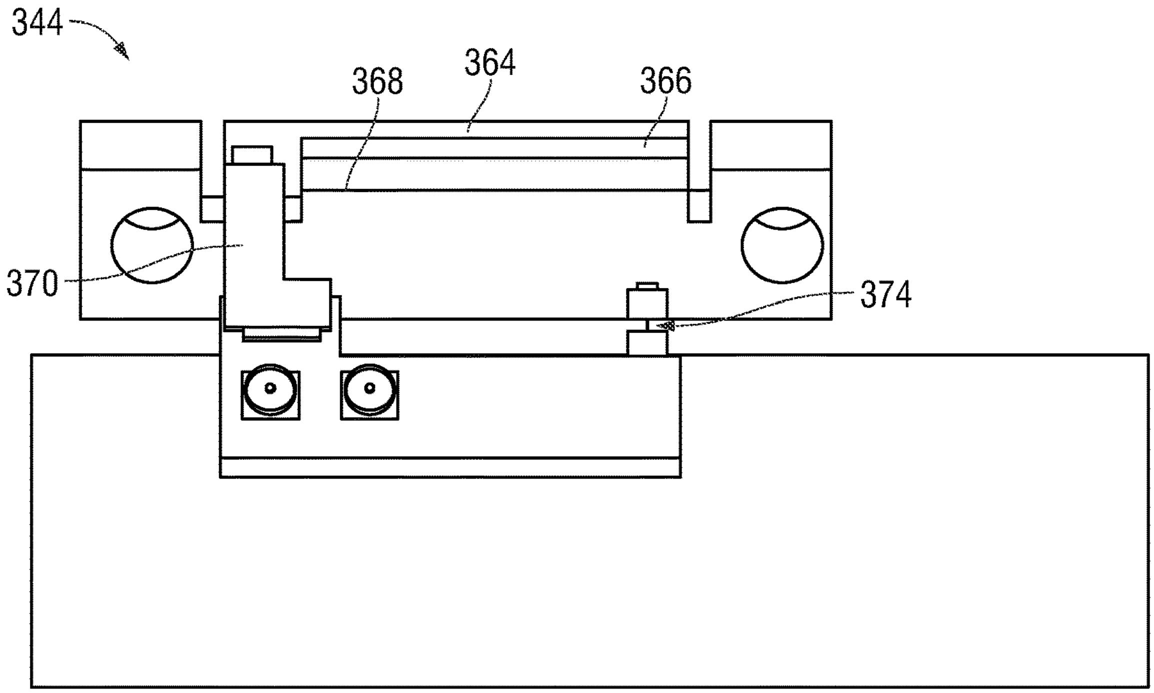
FIG. 3 is a graphic diagram of a converged 5G antenna module according to an embodiment of the present disclosure.

FIG. 3 is a block diagram of a converged 5G antenna module 344 according to an embodiment of the present disclosure. As described herein, the converged 5G antenna module 344 is operatively coupled to both the first antenna front end and second antenna front end. By operatively coupling the first antenna front end at the first Radio subsystem to the converged 5G antenna module 344, the converged 5G antenna module 344 includes a patch antenna array that may be excited at an FR2 frequency. In the embodiment of FIG. 3, the converged 5G antenna module 344 has a mmWave antenna module that includes, for example, a liquid crystal polymer (LCP) adaptor flexible cable 370 operatively coupled to a mmWave antenna printed circuit board 364 including a patch antenna array used to transmit excitation signals to the converged 5G antenna module 344 from the first antenna front end or receive FR2 radio signals. In an embodiment, the converged 5G antenna module 344 may be coupled to a number of radio coaxial cable connectors used to provide an intermediate frequency excitation signal from a first radio subsystem to the first antenna front end that may be co-located at the converged 5G antenna module 344. This excitation signal may be converted to an FR2 frequency. The intermediate frequency (I/F) signal is lower than what the converged 5G antenna module 344 is to be excited at to avoid loss from the first radio subsystem to the first RF front end and the patch antenna array. For example, the first antenna front end may provide an I/F signal at ~10 GHz in an example embodiment. Because the converged 5G antenna module 344 (e.g., a mmWave antenna module) is to be excited at FR2 frequencies ranging from 26 GHz to 40 GHz, the converged 5G antenna module 344 may further include an antenna transceiver and power amplitude module at a co-located as active components at the first antenna front end used to increase the frequency and power of transception at the converged 5G antenna module 344 for the patch antenna array. The first RF front end with the active components for the patch antenna array may be formed on the mmWave antenna PCB 364. These active components may be also formed on the mm Wave antenna PCB 364 within an EM shielding container 366. As these active components for 5G FR2 frequency transmission may generate heat, the cooling element structure 368 (e.g., a heat sink) may help keep these active components cool in an embodiment;

In a further embodiment, the converged 5G antenna module 344 may include a 1×4 patch array of antennas to which the active components are used to increase the gain of coverage 5G antenna and potentially change the phase of any RF EM waves emitted by the converged 5G antenna module 344. The patch antenna array is mounted on the mmWave antenna printed circuit board 365 facing away from the inside of an information handling system and outside of a cooling element structure 368 such as a heat sink.

In an embodiment where the converged 5G antenna module 344 also includes the cooling element structure 368 operating as antenna module of the converged 5G antenna module 344. The cooling element structure may be made of metal and sized to a quarter wavelength of a lowest operating frequency to form an FR1 antenna. For example, in one specific example embodiment, the cooling element structure may be approximately 38 mm in length in order to receive or emit those frequencies associated with the FR1 frequencies as described herein. In particular, approximately 38 mm is a quarter wavelength for approximately 1.8-1.9 GHZ frequencies which comprise the low end of the middle range FR1 frequencies. In an embodiment, the length of the body and structure of the converged 5G antenna module 344 (e.g., a mmWave antenna module) is a quarter wavelength of lowest frequency of a long-term evolution (LTE) antenna within the information handling system and may not be limited to the mid-range FR1 frequencies in some embodiments and the cooling element structure 368 may be sized for a different FR1 frequency band. However, FR1 frequencies in the mid-range are accommodated in a particular example embodiment of FIG. 3 and may range from between 1.8 GHz and 5 GHz, in an example embodiment. With the length of the converged 5G antenna module 344 cooling element structure 368 portion being set to a quarter wavelength of the lowest frequency of a LTE antenna, the body and structure of the cooling element structure 368 portion of the converged 5G antenna module 344 may be utilized for emitting FR1 frequencies at an edge or from the body of the cooling element structure, such as along an edge of a heat sink 368. The excitation feed from the second antenna front end may be provided via a supplemental antenna feed 374 formed to operatively couple to the converged 5G antenna module 344 cooling element structure body 368. In an embodiment, antenna frequency matching circuitry may be included here to enhance the performance characteristics of the 5G antenna module 344 at the FR1 frequencies in an embodiment. In the embodiment, shown in FIG. 3, the supplemental antenna feed 374 may be operatively coupled to a second antenna front end and second radio subsystem used to provide the second antenna excitation feed at a FR1 frequency.

In an embodiment, the converged 5G antenna module 344 may be used in concert with other antenna systems in the information handling system to engage in multiple-input, multiple-output (MIMO) usage. In this embodiment, the information handling system may include a group of FR1 MIMO antennas in an embodiment that include a first or main MIMO antenna, a second or auxiliary MIMO antenna, a third MIMO antenna (e.g., MIMO2), and a fourth MIMO antenna (e.g., MIMO3). In this embodiment, the excitation or reception of the converged 5G antenna module 144 via the second antenna front end 140-2 may be used as the fourth MIMO antenna (e.g., MIMO3). In a particular example embodiment, the MIMO3 antenna may operate only to receive signal so as to avoid SAR power level issues at the converged 5G antenna module 144. Here, in this example embodiment, the frequencies within the FR1 range may be used at the converged 5G antenna module 344 to communicate using a 5G protocol via a FR1 MIMO configuration, for example as a MIMO3 receiving antenna, while concurrently communicating and transceiving data via a FR2 frequencies with the patch antenna array. In these embodiments, the natural duplexing of the FR1 and FR2 frequencies, due to the 20 GHz separation between them, allows the excitation of the converged 5G antenna module 344 at the FR1 and FR2 frequency ranges without the use of a low-band/high-band filter or other diplexing circuitry.

As described herein, by combining an FR2 frequency emitting antenna (e.g., a mmWave antenna module including a patch antenna array) with an FR1 frequency receiving or emitting antenna via the cooling element structure reduces the number of antennas within the housing of the information handling system as a result of a single antenna system being used to perform those transceptions of data that would otherwise be accomplished via two individual antennas. This reduces the overall number of antenna systems within the information handling system. This increases the usable space within the housing of the information handling system in an embodiment. Alternatively, the reduction in the number of antennas within the information handling system 100 allows the dimensions of the information handling system to be decreased and, accordingly, the weight of the information handling system 100 to be reduced in an embodiment. This allows the aesthetics and mobility of the information handling system.

The converged 5G antenna module 344 may include a number of layers used to manage heat and shielding at the converged 5G antenna module 344. The converged 5G antenna module 344 includes the array layer (not shown) that is mounted on an antenna PCB 364 facing away from the cooling element structure 368 and the inside of an information handling system includes the resonating patch elements used to transceive data such as the 1×4 array described herein. An electromagnetic (EM) shielding container 366 may be placed behind the mmWave antenna PCB 364 to shield the antenna PCB 364 and active components from EM interference between the metal components of the information handling system and the interaction between the antenna PCB 364 and other operating antenna, electrical circuits, and RF emissions at the information handling system. In an embodiment, the EM shielding container 366 may also house front end power amplitude module and an antenna transceiver to convert the intermediate frequency to an FR2 frequency as well as other circuitry used to transfer an incoming I/F signal from first radio subsystem to the first antenna front end to a higher frequency (e.g., between 26 GHz to 40 GHz).

As described, the cooling element structure 368 may be a heat sink operatively coupled to the EM shielding container 366 in an embodiment to regulate heat at the antenna PCB 364 and its shieled active component circuitry and prevent damage to the converged 5G antenna module 344 or the mm Wave antenna PCB. The inclusion of the cooling element structure 368 heat sink layer allows the body of the cooling element structure 368 to transceive data at the FR1 frequencies when excited by the supplemental antenna feed 374 based on dimension of the cooling element structure 368 as described above. These layers are described in more detail in connection with FIG. 4.

Figure 4:
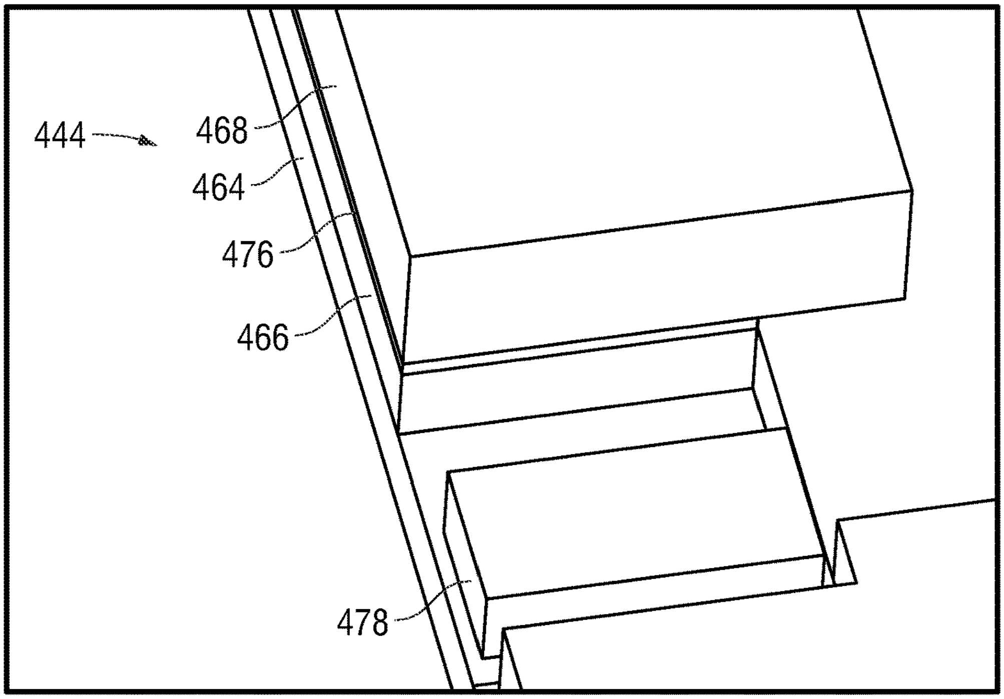
FIG. 4 is a perspective block diagram illustrating a converged 5G antenna module according to another embodiment of the present disclosure.

FIG. 4 is a perspective block diagram illustrating a converged 5G antenna 444 according to another embodiment of the present disclosure. FIG. 4 shows the converged 5G antenna 444 includes the array layer (not shown) formed on a first side of the mmWave antenna PCB 464, the EM shielding container 466, a thermal pad layer, and the cooling element structure 468 as a heat sink. As described, the array layer formed on the opposite side of the antenna PCB 464 includes the resonating elements used to transceive data and may include, in an embodiment, the 1×4 array described herein. In another embodiment, the mmWave antenna PCB 464 may include another or different resonating element or elements than the 1×4 array that facilitate the transception of FR2 frequencies.

The EM shielding container 466 may be any type of shielding layer that reduces the EM field at and around active components of a first RF antenna front end for the mmWave antenna PCB 464 the converged 5G antenna 444. This EM shielding container 466 may specifically be used to block RF EM radiation that would create interference at the array layer and active components for transceiving via the FR2 antenna array on the mm Wave antenna PCB 464. The EM shielding container 466 may be made of one of a sheet metal, a metal screen and a metal foam among other types of other EM shielding materials and forms in the embodiments described herein. In an embodiment, the EM shielding container 466 may also house active components of a mmWave antenna front end including an antenna transceiver, power amplitude module, and other circuitry used to transfer an incoming I/F signal from first radio subsystem to the first antenna front end to a higher frequency FR2 signal (e.g., between 26 GHz to 40 GHz). This antenna transceiver, power amplitude module, or other circuitry may create an amount of heat during their use and may damage the mm Wave antenna PCB 464 or components of the converged 5G antenna module 444. To prevent this, the converged 5G antenna module 444 includes the cooling element structure 468 as a heat sink.

The cooling element structure 468 may be any type of material that receives heat and dissipates it to the environment or to a cooling system within the information handling system to act as a heat sink. In an embodiment, the cooling element structure468 may be made of aluminum or other heat sinking metal which may also transmit or receive radiofrequency signals. The cooling element structure 468 in FIG. 4 may be operatively coupled to a thermal layer 476 that thermally conducts heat to the heat sink cooling element structure 468 from the EM shielding container 466 and the array layer 464 so that the heat may be absorbed from the antenna PCB 464 layer and EM shielding container 466. The thermal layer 476 may be made of a thermally conductive foam, grease thermal paste, graphite, or an aluminum tape among other types of thermally conductive materials. In the embodiments described herein, the cooling element structure468 may have another purpose. The body of the converged 5G antenna module 444 and, in an example, the cooling element structure468 specifically may be used to receive the FR 1 signals from an access point or base station or an excitation signal from the second antenna front end at an FR1 frequency. Because the size of the converged 5G antenna module 444 can be formed so as to be set to a quarter wavelength of the lowest frequency of an LTE antenna for an FR1 frequency range as the length of the body and structure of the converged 5G antenna module 444 cooling element structure 468, the cooling element structure 468 may be utilized for emitting FR1 frequencies at or above the lowest FR1 frequency in the frequency range by the converged 5G antenna module 444. For example, 1.8-1.9 GHz may be received or transmitted along an edge of this heat sink cooling element structure 468 where higher frequencies may be received from the body of the cooling element structure 468. Indeed, a target FR1 frequency or range of frequencies within the FR1 frequencies may be used to determine the sizing of the body and structure of the cooling element structure 468 of the converged 5G antenna module 444. According to the embodiments described herein, the heat sink cooling element structure 468 may be operatively coupled to a second antenna front end via a supplemental antenna feed as described in connection with FIG. 3.

In an embodiment, the converged 5G antenna 444 includes a bridge-to-bridge connector 478. The bridge-to-bridge connector 478 may be used to operatively couple an LCP adaptor flexible cable shown in FIG. 3 to a first radio and front end as described herein. The bridge-to-bridge connector 478 may be used to allow the converged 5G antenna 444 to be made into a modular component of the information handling system allowing for repair or replacement if and when necessary. Further the bridge-to-bridge connector 478 is used to operatively couple the LCP adaptor flexible cable to the mmWave antenna PCB and active antenna circuitry within the EM shielding container 466 and the antenna patch array as described herein.

Figure 5:
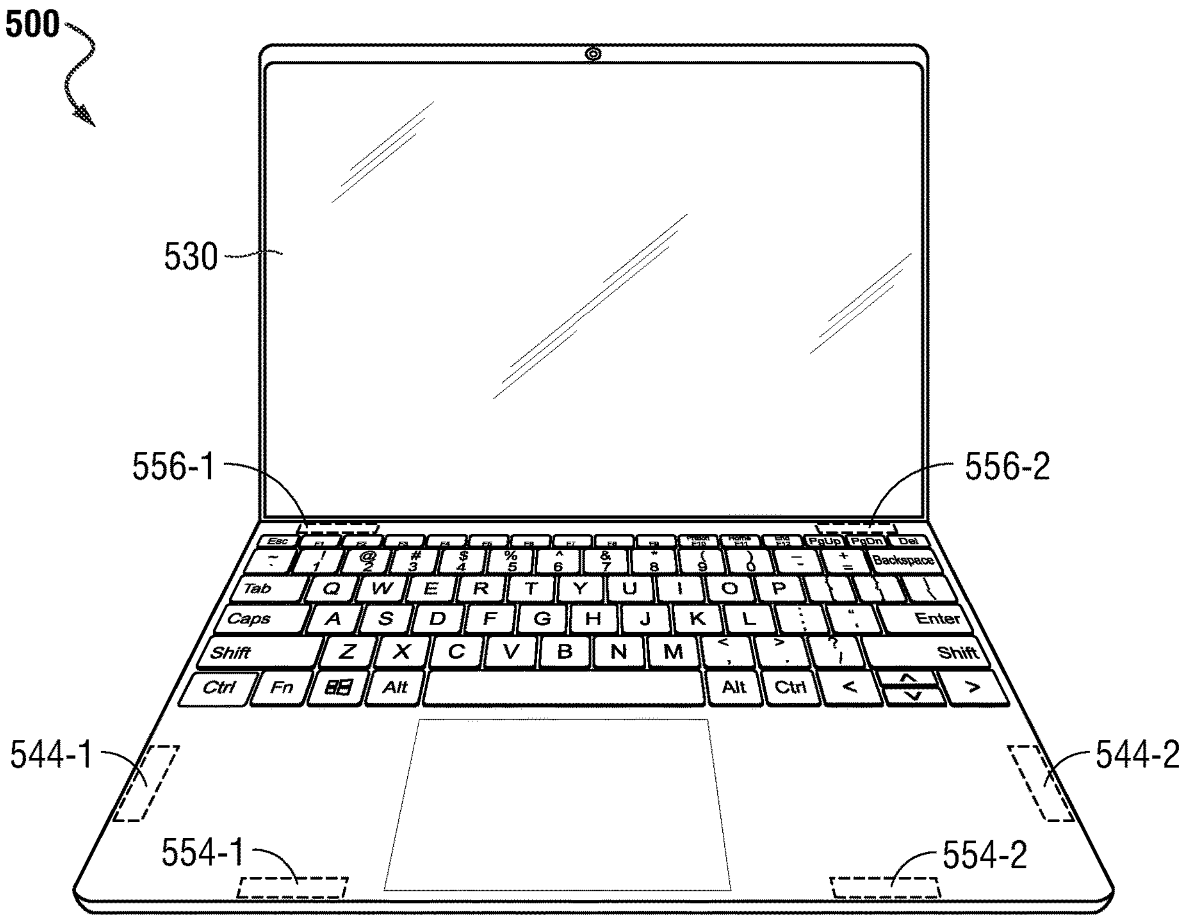
FIG. 5 is a graphic diagram illustrating an information handling system including a plurality of antennas that includes a converged 5G antenna module according to an embodiment of the present disclosure.

FIG. 5 is a diagram illustrating an information handling system 500 including a plurality of antennas 544-1, 544-2, 554-1, 554-2, 556-1 and 556-2 that include converged 5G antenna module 544-1 or 544-2 according to an embodiment of the present disclosure. The location and number of antennas 544-1, 544-2, 554-1, 554-2, 556-1 and 556-2 within the information handling system 500 as shown is meant as an example embodiment. The present specification contemplates more or less of any type of antenna 544-1, 544-2, 554-1, 554-2, 556-1 and 556-2 arranged at locations within the housing of the information handling system 500. The antennas 544-1, 544-2, 554-1, 554-2, 556-1 and 556-2 of the information handling system 500 are shown in ghost outlined with dashed lines to indicate their inclusion into the housing of the information handling system 500.

In an embodiment, the information handling system 500 may include a converged 5G antenna module 544-1 or 544-2, three WWAN antennas 544-1 or 544-2, 554-1, and 554-2, as well as two WLAN antennas 556-1 and 556-2. The WWAN antennas 544-1 or 544-2, 554-1, and 554-2 may operate at, for example, an FR2 frequency similar to the FR2 frequency emitted by the converged 5G antenna module 544-1 or 544-2. In the example embodiment shown in FIG. 5, the ability to emit an FR1 or FR2 frequency from four different antennas, the converged 5G antenna module 544-1 or 544-2 and the WWAN antennas 544-1 or 544-2, 554-1, and 554-2, allows for a MIMO transception to be initiated on a 4×4 MIMO antenna arrangement. In an embodiment, WWAN antennas 544-1 or 544-2, 554-1, and 554-2 may be assigned to act as either a first or main FR1 MIMO antenna, a second or auxiliary FR1 MIMO antenna, and a third FR1 MIMO antenna (e.g., FR1 MIMO2). The converged 5G antenna module 544-1 or 544-2 may be assigned to act as a fourth FR1 MIMO antenna (e.g., FR1 MIMO3). In this embodiment, the reception of FR1 MIMO signals at (or excitation of) the converged 5G antenna module 544 via the second antenna front end 140-2 may be used as the fourth FR1 MIMO antenna (e.g., FR1 MIMO3). Even without the two WWAN antennas 554-1 and 554-2, the converged 5G antenna modules 544-1 or 544-2 may operate with at least one other WWAN antenna on a 2×2 MIMO antenna arrangement and, thereby, still increasing the data transception than would otherwise be realized via the use of the converged 5G antenna module 544-1 or 544-2. In an example embodiment, the FR1 MIMO3 antenna portion of the converged 5G antenna modules 544-1 or 544-2 may receive radio signals in the FR1 mid-range (i.e., from 1.8 GHz to 5 GHz) in some embodiments. The converged 5G antenna module 544-1 or 544-2 may also be assigned to be an active FR2 antenna for transception from a first radio subsystem and RF antenna front end in FR2 frequency ranges.

The information handling system 500 may further include one or more WLAN antennas 556-1 and 556-2. FIG. 5 shows the inclusion of two WLAN antennas 556-1 and 556-2, however, the present specification contemplates that more than two WLAN antennas 556-1 and 556-2 may be used to further establish communications with other devices such as peripheral devices that include wireless mouses, wireless keyboards, a stylus, or any other peripheral device. The information handling system may also include a video/graphic display 530, a touchpad, and other input output devices as described herein with FIG. 1 for example.

Figure 6:
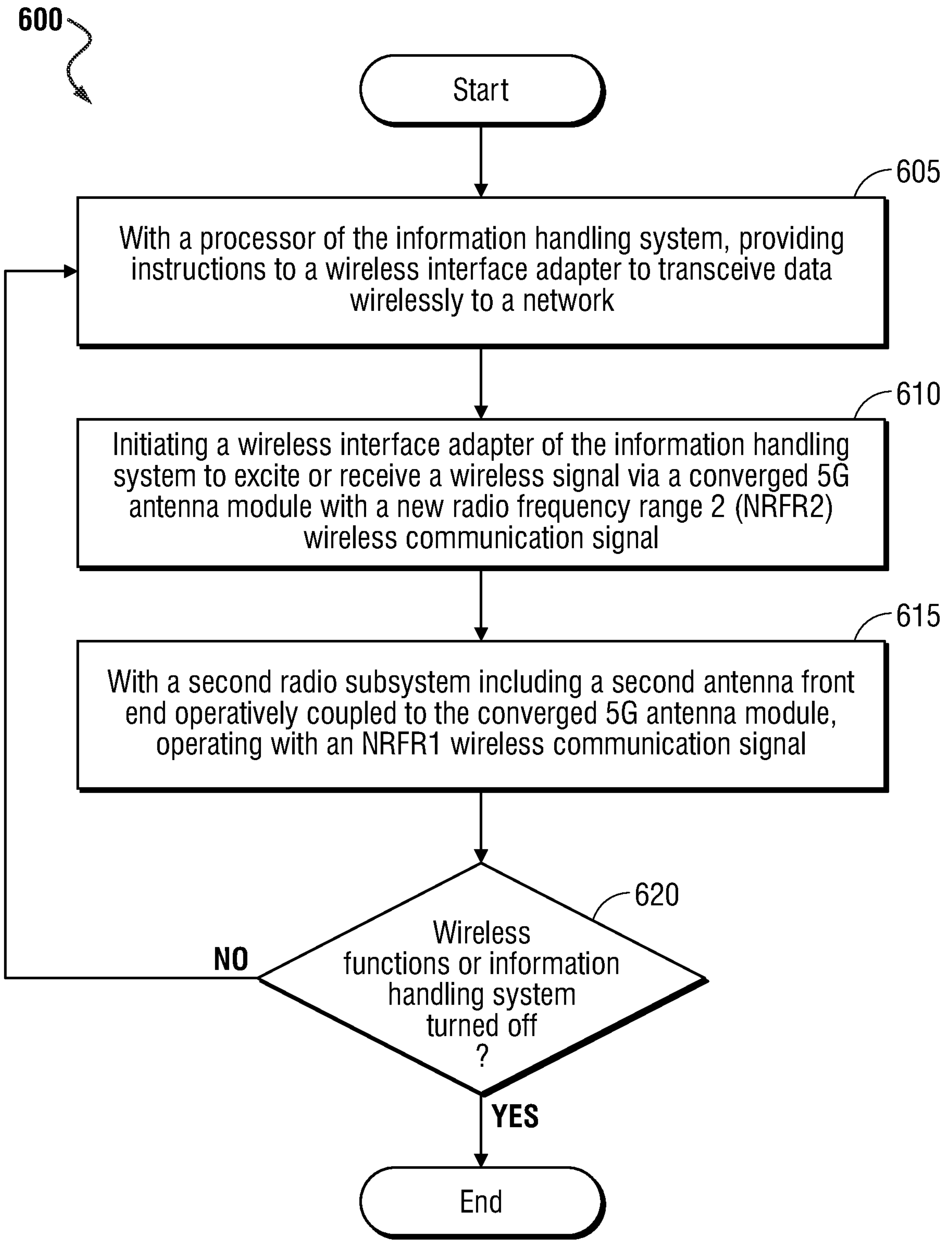
FIG. 6 is a flow diagram illustrating a method implemented at an information handling system to transceive data using a converged 5G antenna module according to an embodiment of the present disclosure.

FIG. 6 is a flow diagram illustrating a method 600 implemented at an information handling system to transceive data using a converged 5G antenna module according to an embodiment of the present disclosure. The method 600 may include, at block 605, with providing instructions to a wireless interface adapter to transceive data wirelessly to a network with a processor of the information handling system. These instructions may be received, in an embodiment, by an antenna controller that instructs one or more radio subsystems with one or more antenna front ends. The antenna front ends may be operatively coupled to a converged 5G antenna module in order to excite or receive wireless communications signals via the converged 5G antenna module under FR1 and FR2 frequencies as described herein.

The converged 5G antenna module is operatively coupled to both a first antenna front end and a second antenna front end. By operatively coupling the first antenna front end at the first radio subsystem to the converged 5G antenna module, the converged 5G antenna module may be excited at an FR2 frequency. In an embodiment, the converged 5G antenna module includes a mmWave antenna module that includes, for example, a liquid crystal polymer (LCP) adaptor flexible cable used to transmit intermediate frequency (I/F) signals to a mmWave antenna PCB at the converged 5G antenna module having a co-located first antenna front end. In an embodiment, the converged 5G antenna module may include a number of radio coaxial cable connectors used to provide the I/F excitation signal to the converged 5G antenna module. In an embodiment, the converged 5G antenna module may include a 1×4 patch array of antennas on the mm Wave antenna PCB as well as active component circuitry to convert the I/F signal to an FR2 wireless communication signal frequency at the co-located first antenna front end. Then the patch antenna array on the mmWave antenna PCB may be used to increase the gain of coverage 5G antenna and potentially change the phase of any RF EM waves emitted by the converged 5G antenna module.

The converged 5G antenna module may include a number of layers used to manage heat and shielding at the converged 5G antenna module for the mmWave antenna PCB and active components thereon. The converged 5G antenna module includes the array layer that is mounted on an antenna PCB that includes the resonating elements used to transceive data at an FR2 frequency such as the 1×4 patch antenna array described herein. An electromagnetic (EM) shielding container may be placed behind the mmWave antenna PCB to shield the mm Wave antenna PCB from EM interference between the metal components and other operating antenna, electrical circuits, and RF emissions of the information handling system and the mmWave antenna PCB and active components thereon. In an embodiment, the EM shielding container may house an antenna transceiver, power amplitude modulator, and other circuitry used to transfer an incoming I/F excitation signal to an FR2 excitation signal for the patch antenna array. The conversion of the I/F signal to an FR2 signal occurs at the co-located first antenna front end and may convert a 10 GHz I/F signal to a higher frequency (e.g., between 26 GHz to 40 GHz) for FR2 transmission. The first antenna front end may receive the I/F signal via operative coupling to a first radio subsystem configured to operate at the FR2 frequency range under the 5G protocol.

As described, a cooling element structure, such as a heat sink, may also be included and operatively coupled to the EM shielding container in an embodiment to regulate heat generated at the mmWave antenna PCB and its shielded active component circuitry to prevent damage to the converged 5G antenna module. The inclusion of the cooling element structure as a heat sink layer allows for a second transmitting antenna system for FR1 frequencies. The edges or body of the cooling element structure may be used to transceive data at the FR1 frequencies when excited by a supplemental FR1 antenna feed.

The method 600 further includes initiating a wireless interface adapter of the information handling system to concurrently excite or receive wireless communication signals at a converged 5G antenna module at a new radio frequency range 1 (NRFR1) frequency and a NRFR2 frequency at block 610. It is appreciated that although the converged 5G antenna module may operate concurrent wireless communications at FR1 and FR2 frequencies, the converged 5G antenna module may also operate as a stand-alone antenna module operating at an NRFR2 frequency, in an embodiment. The concurrent wireless communication using these FR1 and FR2 frequencies is accomplished using a converged 5G antenna module as described herein. This converged 5G antenna module is excited by a wireless interface adapter or receives wireless communication signals to the wireless interface adapter concurrently at a sub-6 GHz FR1 frequency and at a FR2 frequency that is greater than 6 GHz. The converged 5G antenna module may be operatively coupled to an FR1 signal line from a second antenna front end and second radio subsystem to the converged 5G antenna module at the cooling element structure portion. The converged 5G antenna module may additionally receive an I/F signal for conversion to an FR2 excitation frequency at a co-located first antenna front end and its feed from a first radio subsystem. As described herein, the first antenna front end may be operatively coupled to the converged 5G antenna module at the mmWave antenna PCB portion of the converged 5G antenna module. The first antenna front end and active component circuitry on the mm Wave antenna PCB may be operatively coupled to receive I/F signal via an LCP adaptor flexible cable coupled to a coaxial cable connector and one or more coaxial cables. The coaxial cable is in turn operatively coupled to a first radio subsystem supporting operation of the FR2 radio and use of I/F frequency signals to carry the FR2 signal to the first antenna front end to avoid loss on the cabling from the first radio subsystem.

A second antenna front end may also be operatively coupled to the converged 5G antenna module via the supplemental antenna feed operatively coupled to the heat sink cooling element structure on which the mm Wave antenna PCB is mounted. The patch antenna array of the mm Wave antenna PCB transmits away from the cooling element structure and may be shielded by the cooling element structure. The cooling element structure also dissipates heat from the mm Wave antenna PCB and active components of the co-located first antenna front end.

The method 600 may further include, at block 615, providing receiving an NRFR1 wireless communication signal at the converged 5G antenna module with a first radio subsystem including a second antenna front end operatively coupled to the converged 5G antenna module. It is appreciated that although the converged 5G antenna module may operate concurrent wireless communications at FR1 and FR2 frequencies, the converged 5G antenna module may also operate as a stand-alone antenna module operating at an NRFR1 frequency, in an embodiment. In an embodiment, in order to concurrently communicate via an FR1 and FR2 frequency, the converged 5G antenna module may include a cooling element structure, such as a heat sink, comprised of a metal or other heat conductive material. The cooling element structure may be sized to emit those frequencies associated with the FR1 frequencies via the supplemental antenna feed as described herein. In an example embodiment, the cooling element structure is sized to have a length approximately the quarter wavelength of the lowest expected frequency of operation. In one example embodiment, the cooling element structure may operate in the FR1 mid-range from 1.8 GHz to 5 GHz such that the length of the system is a quarter wavelength of approximately 1.8-1.9 GHZ. In a particular embodiment, this the length of the cooling element's structure may be 38 mm. In a further example embodiment, the cooling element structure may be configured to operate as an FR1 MIMO3 antenna as part of a plurality of FR1 MIMO antennas and may be configured for support to only receive signals in the FR1 mid-range of frequencies. This may mitigate concerns about SAR transmission levels since the FR1 antenna portion of the converged 5G antenna only receives radio signals. In this embodiment, an FR1 antenna feed is operably coupled from the body of the cooling element structure to a second antenna front end used to receive or excite the FR1 frequency excitation signals concurrently with the FR2 signals at the patch antenna array portion of the converged 5G antenna as above.

The method includes, at block 625, determining whether the wireless functions or the information handling system itself has been turned off. Where the wireless functions are continuing to be operated, the method 600 may continue at block 605 with requesting and receiving the network telemetry data. Where either the wireless functions or the information handling system itself have been turned off, the method may end.

The blocks of the flow diagrams of FIG. 6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system eating having a converged 5G antenna module comprising:

a processor;

a memory;

a power management unit (PMU);

a wireless interface adapter configured to receive instructions to concurrently excite the converged 5G antenna module at a new radio frequency range 1 (NRFR1) frequency and a NRFR2 frequency;

the converged 5G antenna module including a cooling element structure and a millimeter wave (mmWave) antenna on a mmWave antenna printed circuit board (PCB) operatively coupled to the cooling element structure via a shielding layer disposed between the antenna PCB and the cooling element structure;

a first radio subsystem with a first antenna front end operatively coupled to the mmWave antenna PCB of the converged 5G antenna module configured to transceive an NRFR2 wireless communication signal via the mmWave antenna of the converged 5G antenna module;

a liquid crystal polymer (LCP) adaptor flexible cable operatively coupling the mmWave antenna PCB of the converged 5G antenna module with the first radio subsystem;

a second radio subsystem with a second front end operatively coupled to the cooling element structure formed of metal to transmit an NRFR1 wireless communication signal via signal excitation of the metal of the cooling element structure by the second radio subsystem of the converged 5G antenna module and configured to receive the NRFR1 wireless communication signal via the cooling element structure to be detected by the second radio subsystems via a radiofrequency feed, where the cooling element structure forms a cooling element antenna of the converged 5G antenna module; and the shielding layer to shield the first radio subsystem with the first antenna front end from the mmWave antenna and the cooling element antenna formed of the cooling element structure and thermally couple the mmWave antenna PCB to the cooling element structure, wherein the LCP adaptor flexible cable is operatively coupled to the mmWave antenna PCB through the shielding layer.

2. The information handling system of claim 1, wherein the converged 5G antenna module includes the mmWave antenna on the mmWave antenna PCB including a patch antenna array operatively coupled to the first antenna front end co-located on the mmWave antenna PCB configured to generate an NRFR2 excitation signal at the patch antenna array.

3. The information handling system of claim 1, wherein the converged 5G antenna module includes the shielding layer that is a shielding container around the first antenna front end configured to shield the first antenna front end co-located on the mmWave antenna PCB to generate an NRFR2 excitation signal at the mmWave antenna.

4. The information handling system of claim 1, wherein a body of the cooling element structure is a metal heat sink and has a length of one quarter wavelength of the lowest expected NRFR1 frequency to be received or transmitted operative coupling to the second radio subsystem.

5. The information handling system of claim 1, wherein the converged 5G antenna module includes a 1×4 patch array of antennas on the mmWave antenna PCB situated facing away from the cooling element structure and the information handling system configured to increase the gain of the converged 5G antenna module and control the phase of NRFR2 wireless communication signal emitted by the converged 5G antenna module to steer the NRFR2 wireless communication signal.

6. The information handling system of claim 1 further comprising:

a thermal pad operatively coupled between the cooling element structure and the mmWave antenna PCB of the converged 5G antenna module configured to reduce the heat generated at the first antenna front end co-located on the mmWave antenna PCB and active component circuitry thereon.

7. The information handling system of claim 1, wherein the cooling element structure of the converged 5G antenna module operates as one NRFR1 multiple-input and multiple-output (MIMO) antenna with a plurality of wireless wide-area network (WWAN) antennas that transceive at the NRFR1 frequencies operating as MIMO array of antennas while concurrently transceiving at the NRFR2 frequencies via the mmWave antenna PCB.

8. The information handling system of claim 1, wherein the cooling element structure of the converged 5G antenna module is configured to have a length that is a quarter wavelength of lowest frequency of an NRFR1 mid-band frequency expected to be received at the converged 5G antenna module.

9. A frequency diplexing antenna system for an information handling system comprising:

a wireless interface adapter configured to receive instructions to concurrently operate a converged 5G antenna module at a new radio frequency range 1 (NRFR1) frequency and a NRFR2 frequency;

a first radio subsystem and a first antenna front end operatively coupled to a millimeter wave (mmWave) antenna configured to operate NRFR2 wireless communication signals from the first radio subsystem, where the mmWave antenna is mounted on a mmWave antenn printed circuit board (PCB) on an external face of a metal cooling element structure of the converged 5G antenna module;

a liquid crystal polymer (LCP) adaptor flexible cable operatively coupling the mmWave antenna PCB of the converged 5G antenna module with the first radio subsystem;

a second radio subsystem and a second antenna front end operatively coupled to the metal cooling element structure of the converged 5G antenna module to transmit an NRFR1 wireless communication signal via signal excitation the metal cooling element structure by the second radio subsystem and configured to receive the NRFR1 wireless communication signal via the metal cooling element structure to be detected by the second radio subsystem via a radiofrequency feed, where the metal cooling element structure forms a cooling element antenna of the converged 5G antenna module; and a shielding layer disposed between the mmWave antenna PCB and the cooling element structure and configured to shield the first radio subsystem with the first antenna front end from the mmWave antenna and the cooling element structure and thermally couple the mmWave antenna PCB to the cooling element structure, wherein the LCP adaptor flexible cable is operatively coupled to the mmWave antenna through the shielding layer.

10. The frequency diplexing antenna system of claim 9, wherein the converged 5G antenna module including the first radio subsystem operatively coupled to the mmWave antenna including the first antenna front end co-located with the mm Wave antenna on the mmWave antenna PCB mounted on the external face of the metal cooling element structure of the converged 5G antenna module via a brides-to-bridge connector.

11. The frequency diplexing antenna system of claim 9, wherein a body of the cooling element structure of the converged 5G antenna module is configured to have a length that is a quarter wavelength of lowest frequency of an NRFR1 frequency expected to be received at the converged 5G antenna module.

12. The frequency diplexing antenna system of claim 9, wherein the body of the cooling element structure of the converged 5G antenna module is configured to have a length that accommodates approximately a quarter wavelength of lowest frequency of an NRFR1 mid-band frequency of 1.8-1.9 GHZ.

13. The frequency diplexing antenna system of claim 9, wherein the mmWave antenna of the converged 5G antenna module including a 1×4 patch array of antennas configured increase the gain and control the phase of RF electromagnetic (EM) waves emitted by the converged 5G antenna module to steer the NRFR2 wireless communication signal.

14. The frequency diplexing antenna system of claim 9, further comprising:

a thermal pad to operatively couple to the cooling element structure configured to be a heat sink to the first antenna front end and active components therein co-located with the mmWave antenna configured to reduce the heat generated at the converged 5G antenna module during concurrent operation of the converged 5G antenna module at the NRFR1 frequency and the NRFR2 frequency.

15. The frequency diplexing antenna system of claim 9, wherein the cooling element structure of the converged 5G antenna module operates as one of a plurality of wireless wide-area network (WWAN) multiple-input and multiple-output (MIMO) array of antennas that transceive at the NRFR1 frequencies.

16. An information handling system having a converged 5G antenna module comprising:

a processor;

a memory;

a power management unit (PMU);

a wireless interface adapter configured to receive instructions to concurrently excite a converged 5G antenna module at a new radio frequency range 1 (NRFR1) frequency and a NRFR2 frequency;

the converged 5G antenna module including a cooling element structure and a millimeter wave (mmWave) antenna on a mmWave antenna printed circuit board (PCB) coupled to the cooling element structure;

a first radio subsystem operatively coupled to a first antenna front end co-located with the mmWave antenna PCB of the converged 5G antenna module configured to transceive an NRFR2 wireless communication signal via the mmWave antenna of the converged 5G antenna module;

a liquid crystal polymer (LCP) adaptor flexible cable operatively coupling the mmWave antenna PCB of the converged 5G antenna module with the first radio subsystem in the information handling system;

a second radio subsystem with a second front end operatively coupled to the cooling element structure of the converged 5G antenna module to transmit an NRFR1 wireless communication signal via signal excitation of the cooling element structure by the second radio subsystem and configured to receive the NRFR1 wireless communication signal via the metal cooling element structure via a radiofrequency feed, where the cooling element structure forms a cooling element antenna of the converged 5G antenna module; and a shielding layer disposed between the mmWave antenna PCB and the cooling element structure and configured to shield the first radio subsystem with the first antenna front end from the mmWave antenna and the cooling element structure and thermally couple the mmWave antenna PCB to the cooling element structure.

17. The information handling system of claim 16, wherein the converged 5G antenna module includes the mmWave antenna on the mmWave antenna PCB including a patch antenna array operatively coupled to the first antenna front end co-located on the mmWave antenna PCB configured to receive an intermediate frequency wireless communication signal at a lower frequency than the NRFR2 frequency and to generate the NRFR2 wireless communication signal at the NRFR2 frequency.

18. The information handling system of claim 16, wherein the first antenna front end co-located with the mmWave antenna PCB having one or more active components including power amplitude modulator and a transceiver generating heat; and the cooling element structure formed of metal and configured to operate as a heat sink to reduce generated heat of the one or more active components.

19. The information handling system of claim 1, wherein a body of the cooling element structure is a metal heat sink and has a length of one quarter wavelength of the lowest expected NRFR1 frequency to be received or transmitted by the second radio subsystem.

20. The information handling system of claim 1, wherein the mmWave antenna comprises a 1×4 patch array of antennas on the mm Wave antenna PCB situated facing away from the cooling element structure and the information handling system.

* * * * *